United States Patent [19]

Burrows

[11] Patent Number: 4,830,744

[45] Date of Patent: * May 16, 1989

[54] REVERSE OSMOSIS ASSEMBLY OPERATING VALVE

[76] Inventor: Bruce D. Burrows, 25145 W. Avenue Stanford, Valencia, Calif. 91355

[*] Notice: The portion of the term of this patent subsequent to Apr. 14, 2004 has been disclaimed.

[21] Appl. No.: 1,042

[22] Filed: Jan. 7, 1987

Related U.S. Application Data

[63] Continuation of Ser. No. 685,546, Dec. 24, 1984, Pat. No. 4,657,674.

[51] Int. Cl.[4] .............................................. B01D 13/00
[52] U.S. Cl. .................................. 210/110; 210/195.2; 210/257.2
[58] Field of Search ................. 210/110, 195.2, 257.2, 210/652; 137/599.1, 625.18, 625.27

[56] References Cited

U.S. PATENT DOCUMENTS

| | | |
|---|---|---|
| D. 273,976 | 5/1984 | Burrows . |
| D. 273,977 | 5/1984 | Burrows . |
| D. 274,452 | 6/1984 | Burrows . |
| 2,954,799 | 10/1960 | Kryzer et al. . |
| 3,089,513 | 5/1963 | Kirk, Jr. . |
| 3,493,496 | 2/1970 | Bray . |
| 3,542,199 | 11/1970 | Bray . |
| 3,568,843 | 3/1971 | Brown . |
| 3,719,593 | 3/1973 | Astil . |
| 3,726,793 | 4/1973 | Bray . |
| 3,773,076 | 11/1973 | Smith . |
| 3,794,173 | 2/1974 | Bray .............................. 210/257.2 |
| 3,831,757 | 8/1974 | Gossett et al. . |
| 3,887,463 | 6/1975 | Bray . |
| 3,963,612 | 6/1976 | Gossett et al. . |
| 3,967,638 | 7/1976 | Tondreau . |
| 4,021,343 | 5/1977 | Tyler . |
| 4,086,166 | 4/1978 | Martin . |
| 4,176,063 | 11/1979 | Tyler . |
| 4,210,533 | 7/1980 | Astl . |
| 4,288,326 | 9/1981 | Keefer ............................. 210/257.2 |
| 4,347,132 | 8/1982 | Davis . |
| 4,391,712 | 7/1983 | Tyler et al. . |
| 4,585,554 | 4/1986 | Burrows . |
| 4,595,497 | 6/1986 | Burrows . |
| 4,657,674 | 4/1987 | Burrows ......................... 210/257.2 |

Primary Examiner—Benoit Castel
Attorney, Agent, or Firm—Kelly, Bauersfeld & Lowry

[57] ABSTRACT

A single control valve and associated conduits for operating a reverse osmosis assembly that includes a reverse osmosis cartridge, a reservoir that has a movable barrier therein that subdivides the interior into first and second confined spaces of variable volume, and a manually operated purified water dispensing valve, so that as the first confined space approaches a filled condition with purified water, the single control valve throttles the flow of pressurized feed water to the cartridge to minimize the use of feed water in the operation thereof, with the maximum backpressure to which purified water is subjected in discharging from the cartridge being that due to the weight of reject water in the second confined space, and a membrane in the reverse osmosis cartridge being fast-flushed with feed water to remove foreign material therefrom when the purified water dispensing valve is discharging purified water.

6 Claims, 1 Drawing Sheet

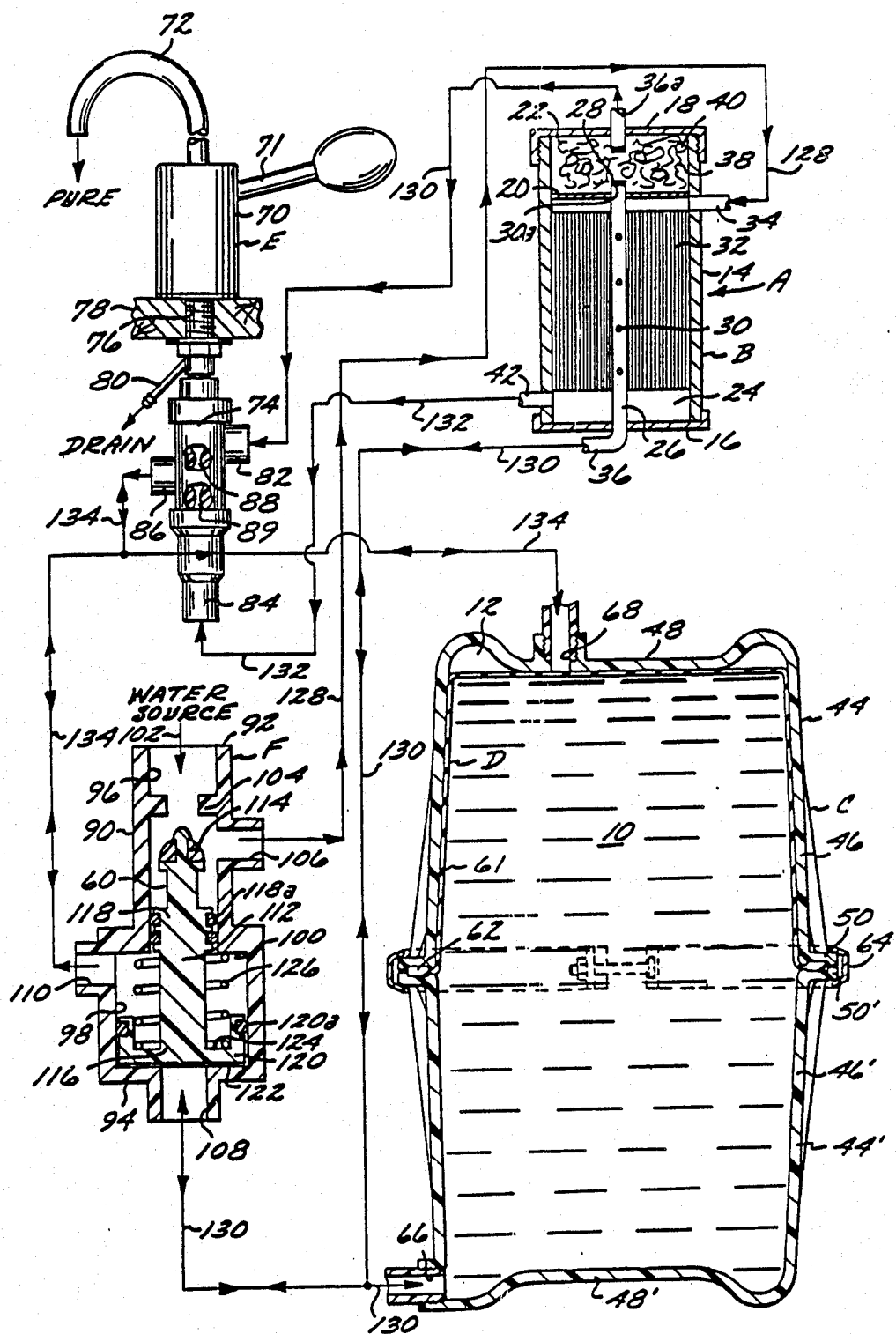

REVERSE OSMOSIS ASSEMBLY OPERATING VALVE

BACKGROUND OF THE INVENTION

This application is a continuation of copending application Ser. No. 685,546, filed Dec. 24, 1984, now U.S. Pat. No. 4,657,674 which is a substitute application for application Ser. No. 458,165, filed Jan. 14, 1983, and now abandoned, which in turn is a continuation of application Ser. No. 380,625, filed May 21, 1982, and now abandoned, which is a continuation-in-part of application Ser. No. 219,331, filed Dec. 22, 1980, and now abandoned, which is a continuation of application Ser. No. 087,881, filed Oct. 24, 1979, and now abandoned, which in turn is a continuation of application Ser. No. 004,652, filed Jan. 19, 1979, and now abandoned, which is a continuation of application Ser. No. 867,363, filed Jan. 6, 1978, and now abandoned.

In prior art reverse osmosis assemblies of the type that are located under the sink in a kitchen, purified water discharges from a reverse osmosis cartridge at a substantial backpressure that prevents the assembly from operating at optimum efficiency, and also prevents the rate of flow of feed water to the reverse osmosis cartridge from continuing at a uniform rate even when the purified water storage facility is approaching the maximum volume for which it is designed.

A major object of the present invention is to provide a single control valve that throttles and reduces the rate of flow of pressurized feed water to the reverse osmosis cartridge when the reservoir for purified water has reached substantially the maximum volume for which it is designed. As a result, a reverse osmosis assembly including the present invention may be operated over a prolonged period of time, with substantially less use of pressurized feed water than with prior art devices of this nature, and with a resultant monetary savings to the user.

Another object of the invention is to furnish a reverse osmosis assembly that includes the present invention wherein the maximum backpressure to which purified water is subjected in discharging from the reverse osmosis cartridge is that due only to the weight of reject water situated in a second confined space of variable volume located above a first confined space in which purified water is stored, the water in the second confined space being connected via conduit means to a purified water dispensing valve.

A further object of the invention is to supply an assembly that not only has the operational advantages above enumerated, but in addition one that permits the addition of minerals that are desirous to be incorporated in purified water for health and other purposes prior to the purified water being discharged from the purified water dispensing valve.

These and other objects and advantages of the invention will become apparent from the following description of a preferred form thereof.

SUMMARY OF THE INVENTION

The control valve of the present invention is used in combination with a source of pressurized feed water, and a reverse osmosis assembly. The reverse osmosis assembly includes a reverse osmosis cartridge having a feed water inlet, a reject water outlet, and a purified water outlet. The assembly further comprises a reservoir container that includes a movable barrier that subdividing the interior of the container into first and second confined spaces of variable volume each in communication respectively with first and second passages in the reservoir container.

The assembly also includes a purified water dispensing valve that has a purified water inlet and a purified water dispensing outlet. The dispensing valve further includes a reject water drain outlet, a reject water passage, a reject water inlet, and dual internal flow restrictors for controlling reject water flow. A two position valve actuator such as a manually operated handle is provided on the dispensing valve, although an electrical, hydraulic, or other mechanical actuator may be used, if desired. The valve actuator when in a first or closed position obstructs communication between the purified water inlet and purified water dispensing outlet and allows reject water entering through the reject water inlet to flow through both flow restrictors for discharge to the reject water drain outlet. Reject water expelled from the second confined space of the reservoir container as purified water fills the expanding first confined space flows into the reject water passage and through a second one of the flow restrictors for discharge to the drain outlet.

The two position valve actuator is movable to a second or open position opening purified water flow from the purified water inlet to the purified water dispensing outlet for use, for example, for drinking, etc. At the same time, reject water entering the reject water inlet is rerouted to substantially bypass the first flow restrictor and to flow out of the reject water passage to the second confined space in the reservoir container, thereby increasing the volume thereof and forcing purified water from the first confined space to the dispensing valve purified water inlet. When the valve actuator is returned to the first position to terminate dispensing of purified water, purified water resumes flow from the cartridge to the first confined space to force reject water in the second confined space to flow through the reject water passage and second flow restrictor to the drain outlet, as previously described. After the first confined space has been substantially refilled with purified water, the single control valve of the present invention throttles and reduces the rate of flow of feed water to the reverse osmosis cartridge to minimize the quantity of feed water required to provide the reservoir container with a stored quantity of purified water that may be intermittently withdrawn therefrom by use of the purified water dispensing valve.

The single control valve of the present invention includes an elongated vertically positioned valve body having an upper end and a lower end, with an elongated internal passage extending downwardly from the upper end to develop into an axially aligned elongated chamber of substantially greater transverse area than that of said elongate passage. This chamber is defined in part by the lower end of the valve body and an intermediate body shoulder at a junction of the elongated passage and chamber.

The elongated passage is in communication at the upper end of the valve body with the source of pressurized feed water. A ring-shaped valve seat is situated in the elongated passage for controlling feed water inflow, as will be described. A feed water outlet in the valve body is in communication with the elongated passage downstream relative to the valve seat. A purified water passage is defined in the valve body lower end, and a reject water passage is also defined in the valve body that communicates with the chamber at a position spaced upwardly a substantial distance from the lower end.

An elongated valve member is movably disposed in the valve body and includes upper and lower end surfaces. The upper end surface of the valve member is adapted for sealing with the valve seat when the valve member is in a first position. The valve member includes a first piston intermediate the upper and lower ends thereof, which first piston slidably and sealingly engages the valve body within the elongated passage. A second piston is defined on the lower end surface of the valve member, with the second piston slidably and sealingly engaging the walls of the chamber. The second piston has a ring-shaped upper end surface of lesser transverse area than the lower end surface.

The pressurized feed water source connected to the upper end of the valve body exerts a first downward force on the valve member that tends to move the valve member downwardly from the first position to a second position retracted from the valve seat to permit the pressurized feed water to flow through the feed water outlet in the valve body. A spring disposed in the chamber of the valve body exerts a second downward force on the valve member by acting against the second piston to assist the first downward force exerted on the valve member by the pressurized feed water contacting the upper end surface of the valve member.

A number of conduits are employed in operating the control valve of the present invention in association with the reverse osmosis assembly. The conduits include a first conduit connecting the feed water outlet in the valve body to the feed water inlet in the reverse osmosis cartridge. A second conduit couples the purified water outlet of the reverse osmosis cartridge with the first confined space in the purified water reservoir container, the purified water passage in the valve body, and the purified water inlet in the purified water dispensing valve. A third conduit couples the reject water outlet of the reverse osmosis cartridge with the reject water inlet of the purified water dispensing valve. A fourth conduit couples the second confined space of the reservoir container with the reject water passage in the purified water dispensing valve and the reject water passage in the valve body of the single control valve of the present invention.

When the valve actuator of the dispensing valve is moved to the second or open position, communication is established between the first confined space containing the purified water and the purified water dispensing outlet. Substantially all pressurized feed water now flowing into the reverse osmosis cartridge fast-flows across the reverse osmosis membrane therein to remove foreign or other material therefrom and then enters the second confined space to expand it, with the reject water in the second confined space exerting a force through the barrier on the purified water in the first confined space that causes the purified water to flow therefrom and discharge through the purified water dispensing outlet. The reject water not only exerts this force on the barrier, but also exerts a downward force on the upper surface of the control valve second piston to assist in retaining the valve member in the second position, namely, permitting feed water inflow.

When the valve actuator is returned to the first or closed position, communication between the purified water in the first confined space and the purified water dispensing outlet is obstructed. However, the valve member of the control valve initially remains in the second position to allow pressurized feed water to flow to the reverse osmosis cartridge with purified water flowing from the reverse osmosis cartridge to the first confined space to expand and fill the latter. Reject water from the reverse osmosis cartridge flows through the third conduit to the reject water inlet in the purified water dispensing valve and then through the first and second flow restrictors to the reject water drain outlet, and concurrently reject water in the second confined space is expelled therefrom as the first confined space expands. Reject water in the second confined space flows through the fourth conduit to the reject water passage in the purified water dispensing valve and then through the second flow restrictor to the reject water drain outlet. The flow of purified water and reject water so continues until the first confined space approaches a maximum volume, whereupon the pressure of the purified water therein increases to the extent that it exerts an upward force on the lower surface of the control valve second piston which is greater than the combined downward forces exerted by the spring and the pressurized feed water. Due to this increased force on the lower surface of the control valve second piston, the valve member moves upwardly toward the first position and in so doing throttles and reduces the rate of flow of pressurized feed water to the reverse osmosis cartridge, with a consequent savings of feed water being achieved.

BRIEF DESCRIPTION OF THE DRAWING

The accompanying is a diagrammatic view of a reverse osmosis assembly, with the single control valve of the present invention illustrated as being associated therewith to throttle the flow of feed water to the reverse osmosis cartridge as the purified water reservoir becomes substantially filled with purified water.

DETAILED DESCRIPTION OF THE PREFERRED EMBODIMENT

The reverse osmosis assembly A shown in the exemplary drawing includes a reverse osmosis cartridge B and a reservoir container C that has a movable barrier D therein, which barrier subdivides the interior of the reservoir container into a first lower confined space 10 and a second upper confined space 12 of variable volumes. The assembly includes a purified water dispensing valve E that also controls the flow of reject water produced by the reverse osmosis cartridge B. A single control valve F, in accordance with the present invention, throttles the flow of feed water to the reverse osmosis cartridge B when the purified water has discharged into the first confined space 10 to the extent that the latter is of substantially maximum volume.

The reverse osmosis cartridge B is illustrated as including a cylindrical sidewall 14 that has a first end piece 16 and a second end piece 18 removably mounted thereon. A transverse partition 20 is situated within the cylindrical sidewall 14 and subdivides the interior of the cartridge B into first and second compartments 22 and 24. A rigid tube 26 is longitudinally disposed within the cartridge B and extends through the partition 20 to terminate in an upper closed end 28. A series of openings 30 are formed in the portion of the tube in the second compartment 24 and similar openings 30a are formed in the portion of the tube situated in the first compartment 22. A reverse osmosis membrane 32 is disposed in the second compartment 24 and envelopes the portion of the tube 26 therein that has the openings 30 therein. The general construction and operation of this reverse osmosis cartridge B is well understood by those skilled in the art and thus the cartridge will not be described in detail herein.

The cartridge B has a first purified water outlet 36 and a second purified water outlet 36a. The first compartment 22 contains activated carbon 38 and may also contain pellets or particles of a soluble mineral compound 40 such as dolomite or the like, which dissolves in the purified water prior to the same being dispensed from the reverse osmosis assembly A. For health purposes, it may be desirable to add magnesium and calcium to the purified water by contact with dolomite 40 or by other means. The reverse osmosis cartridge B further includes a reject water outlet 42 in communication with the second compartment 24.

The reservoir container C is illustrated as being formed from two cup-shaped members 44 and 44' that have conical sidewalls 46 and 46' that merge into end pieces 48 and 48'. The free ends of the sidewalls 46 and 46' develop into outwardly extending ring-shaped flanges 50 and 50' as shown. The movable barrier D is illustrated as being in the form of a cup 61 that is formed from a pliable water impervious material such as rubber that is nontoxic when in contact with the purified water, and the cup 61 on the free ends thereof develops into an outwardly extending ring-shaped flange 62. The flange 62 as shown is disposed between the flanges 50 and 50', with the flanges 50 and 50' being engaged by a circumferentially tensionable band 64 that when tightened draws the flanges 50 and 50' together and exerts a sealing force on the flange 62. The upper cup-shaped member 44 has a reject water passage 68 therein leading into the second confined space 12, and the lower cup-shaped container member 44' has a purified water passage 66 therein that communicates with the first confined space 10.

The purified water dispensing valve E is provided in a preferred form in accordance with the dispensing valve shown and described in my copending application Ser. No. 295,696, filed Aug. 24, 1981, and now abandoned, and a parent application of my later-filed application Ser. No. 573,155, filed May 1, 1984, now U.S. Pat. No. 4,585,554, the subject matter of which is incorporated by reference herein. More particularly, as shown generally in the illustrative drawings, the dispensing valve E includes a body 70 that has a purified water dispensing spout 72 extending upwardly therefrom and an extension 74 of the body 70 extending downwardly through an opening 76 defined in a drain board 78 that normally will be disposed adjacent a sink (not shown). The extension 74 has a reject water drain 80 extending downwardly and outwardly therefrom. In addition, the extension 74 includes a purified water inlet 82 and a reject water inlet 84, as well as a reject water passage 86. First and second flow restrictors 89 and 88 are disposed within the extension 74. The dispensing valve E includes a two position valve actuator 71 that may occupy either a first or closed position or a second or open position.

When the actuator 71 is in the first or closed position, flow of purified water from the purified water inlet 82 to the dispensing spout 72 is obstructed, and reject water flowing into the reject water inlet 84 must flow through both the first and second flow restrictors 89 and 88 prior to discharging to the drain 80. However, when the actuator 71 is in the second or open position, purified water may flow from the purified water inlet 82 to the spout 72, and reject water entering the reject water inlet 84 substantially bypasses the first flow restrictor 89 to flow from the reject water passage 86 for reasons that will later be described. Also, for reasons that will later be described, reject water flowing into the reject water passage 86 must flow through the second flow restrictor 88 prior to discharging from drain 80. In summary, all reject water entering the reject water inlet 84 must flow through at least the second flow restrictor 88 prior to discharging to drain 80.

The single control valve F includes an elongated valve body 90 that has an upper end 92 and lower end 94. An elongated passage 96 extends downwardly from the upper end 92 to develop into a 98 that is of substantially greater transverse cross section. The passage 96 and chamber 98 at their junction define a body shoulder 100. The upper end of passage 96 is in communication with a source 102 of pressurized feed water.

A ring-shaped valve seat 104 projects inwardly into the passage 96 and is intermediately disposed between the upper end 92 and a feed water outlet 106 that is in communication with the passage 96. A purified water passage 108 is formed in the lower end 94 and communicates with the chamber 98. A reject water passage 110 is formed in the valve body 90 and communicates with an upper portion of the chamber 98.

The single control valve F further includes an elongated valve member 112 that has an upper end 11 and a lower end 116. The valve member 112 adjacent the upper end 114 defines a first piston 118 that extends into the passage 96 and supports a number of sealing rings 118a in slidable sealing contact with the portion of the valve body defining the passage 96. A second piston 120 that supports sealing rings 120a is mounted on the lower end 116 of the valve member 112 and is longitudinally and sealingly movable in the chamber 98. The second piston 120 has a lower end surface 122 and an upper ring shaped surface 124 that is of less transverse cross section than the lower end surface 122.

A first conduit 128 extends between the pressurized feed water outlet 106 and the feed water inlet 34 in the reverse osmosis cartridge B. The first purified water outlet 36 of the reverse osmosis cartridge B is coupled with a second conduit 130 that communicates with the purified water passage 108 and also with the purified water passage 66 in the reservoir container C, which passage 66 is in communication with the first confined space 10. The second purified water outlet 36a of the cartridge B is connected by another portion of the second conduit 130 to the purified water inlet 82 in the purified water dispensing valve E.

A third conduit 132 is in communication with the reject water outlet 42 of the cartridge B and the reject water inlet 84 in the dispensing valve E. A fourth conduit 134 is in communication with the reject water passage 68 in the reservoir container C, which passage 68 is in communication with the second confined space 12. In addition, the fourth conduit 134 is in communication with the reject water passage 86 in the dispensing valve E as well as the reject water passage 110 in the single control valve F.

Discharge of purified water from the dispensing spout 72 in the dispensing valve E is controlled by the valve actuator 71, with the actuator 71 when in a first or closed position obstructing communication between the second conduit 130 and the dispensing spout 72. Purified water discharging from the reverse osmosis cartridge B will flow through the second conduit 130 to the purified water passage 66 to enter and fill the first confined space 10 as well as the purified water passage 108 that communicates with the chamber 98 below the second piston 120.

When the valve actuator 71 is in this first or closed position, reject water from the reverse osmosis cartridge B flows through the third conduit 132 to the reject water inlet 84 in the purified water dispensing valve E to flow upwardly through the valve and through the first and second flow restrictor 89 and 88 to discharge through the drain outlet 80.

When the valve actuator 71 is moved to the second or open position, communication is established between the purified water inlet 82 and the purified water dispensing spout 72. Purified water may now flow from the first confined space 10 through the second conduit 130 to tube 26 and openings 30a upwardly into the first compartment 22 to be subjected to the activated carbon 38 therein which removes dissolved gases from the purified water. The purified water discharges through the second outlet 36a into the portion of the second conduit 130 that extends to the purified water inlet 82 in the purified water dispensing valve E. Purified water entering the inlet 82 in valve E can flow through the valve to discharge from the purified water dispensing spout 72 only when the actuator 71 is in the second or open position. The purified water supplied to spout 72 may contain dissolved minerals due to contact with the dolomite or other mineral particles 40. The particles 40 if desired may be preformed tablets that are formulated to contain desired minerals that are considered advantageous to the health of the users of purified water from the invention.

When the valve actuator 71 is in the second or open position, reject water discharges through the third conduit 132 to enter the reject water inlet 84 of the dispensing valve E to substantially bypass the first flow restrictor 89 and flow through the reject water passage 86 into the fourth conduit 134. Due to the reject water bypassing the first flow restrictor 89 the rate of flow of reject water into the fourth conduit 134 is at a rapid rate as it is subjected to substantially no backpressure. Substantially all the feed water flowing into the reverse osmosis cartridge B discharges therefrom as reject water into the third conduit 132 during this phase of operation of the invention.

The pressurized feed water from the source 102, at all times exerts a downward force on the upper end 114 of valve member 112 of the control valve F, wherein this downward force tends to cause the valve member 112 to move downwardly from a first position where end 114 wa in abutting contact with valve seat 104 to a second position where upper end 114 is below valve seat 104.

As reject water at the rapid rate flows into the second confined space 12 through the fourth conduit 134 as well as to the chamber 98 through another portion of the conduit 134, the pressure on reject water in the second confined space 12 increases and exerts a downward force through the barrier D onto the purified water in the first confined space 10, with purified water being forced therefrom to flow through the second conduit to the dispensing valve E to discharge from the dispensing spout 72.

The lower surface 122 of second piston 120 that is exposed to purified water is substantially greater than the upper ring-shaped upper surface 124 of the second piston that is in contact with reject water in chamber 98. Accordingly, while the pressure on the purified water in the first confined space 10 increases to exert an upwardly directed force on the lower surface 122 of the second piston 120, this upward force is less than the forces exerted by the pressurized reject water on the upper ring-shaped surface 124 of the second piston 120, and pressurized feed Water on the upper end 114 of valve member 112 and the upper surface of the first piston 118. The valve member 12 during the dispensing of purified water will thus remain in the second position permitting feed water flow to the cartridge B.

When the valve actuator 71 is returned to the first or closed position, flow of purified water from the purified water inlet 82 of the dispensing valve E to the dispensing spout 72 is obstructed. Purified water from the reverse osmosis cartridge B now flows through the second conduit 130 to the first confined space 10 of the container C. As purified water continues to discharge through the second conduit 130 into the first confined space 10, the first confined space 10 expands and exerts an upward force on reject water in the second confined space 12, with the reject water being forced or expelled from the second confined space 12 through the fourth conduit 134 to the reject water passage 86 in the purified water dispensing valve E, with the reject water subsequently flowing upwardly through the second restrictor 88 to discharge through the reject drain outlet 80.

After purified water has discharged from the reverse osmosis cartridge B through the second conduit 130 to the first confined space 10 to the extend that the confined space is approaching maximum volume, the purified water in the first confined space exerts a pressure through the second conduit 130 on the lower end surface 122 of the piston 120 that is sufficient to overcome the downward forces acting of the valve member 112, whereby the valve member 112 now moves upwardly for the upper end 114 thereof to approach the valve seat 104 and throttle the flow of feed water to the reverse osmosis cartridge B after the first confined space 10 is substantially filled with purified water. Such throttling results in a substantial saving of the quantity of pressurized feed water required to operate the reverse osmosis assembly A over a period of time and a substantial saving in money being effected to the user of the assembly.

From experience it has been found that when the pressure on feed water source 102 is relatively low there will not be a first force exerted on the valve member end 114 and upper surface of first piston 118 sufficient to overcome the friction offered by the sealing rings 118a and 120a as the valve member 112 tends to be forced from the first to the second position. To nullify this frictional resistance, a compressed helical spring 126 is provided that encircles valve member 112 in chamber 98. With one end of the spring abutting against body shoulder 100 and the opposite end against second piston 120. When the pressure on the feed water source 102 is sufficiently high to overcome the frictional resistance above described, the spring 126 may be dispensed with The use and operation of the invention has been explained previously in detail and need not be repeated.

What is claimed is:

1. A reverse osmosis water supply system, comprising:

an inlet conduit for supplying a source of feed water under pressure;

a reverse osmosis unit coupled to said inlet conduit and including means for separating the feed water into purified water and reject water;

a control valve having a single internal movable valve member for controlling feed water flow through said inlet conduit to said reverse osmosis unit, said control valve including a valve body having a feed water inlet coupled to said inlet conduit and a feed water outlet coupled to said reverse osmosis unit, and a valve seat between said feed water inlet and outlet;

a reservoir container having a purified water reservoir and a reject water reservoir separated by a movable barrier;

means for coupling purified water from said reverse osmosis unit to said purified water reservoir;

means for coupling reject water from said reverse osmosis unit to said reject water reservoir;

a dispensing valve including a valve actuator movable between open and closed positions;

means for coupling said purified water reservoir to said dispensing valve for dispensing of the purified water when said actuator is in the open position;

said valve member of said control valve including a piston member;

means for subjecting one side of said piston member to the pressure of the purified water within said purified water reservoir to urge said valve member toward a closed position seated upon said valve seat to prevent feed water flow to said feed water outlet; and means for subjecting the other side of said piston member to the pressure of reject water within said reject water reservoir to urge said valve member toward an open position retracted from said valve seat to permit feed water flow to said feed water outlet;

said valve body including a valve passage of a first cross section in communication with said feed water inlet and outlet, and a valve chamber of a second cross section, said second cross section being relatively large in relation to said first cross section, said piston member comprising an elongated one-piece component including a first piston within said valve passage for movement relative to said valve seat to open and close said valve seat, and a second piston within said valve chamber and having a first side subjected to the reject water pressure and a second side subject to the purified water pressure;

whereby said valve member is displaced to the open position by the combined effects of the pressure of feed water at the feed water inlet and the pressure of the reject water in the reject water reservoir when said actuator is moved to the open position and to maintain said valve member in the open position upon initial movement of said actuator to the closed position until the pressure of the purified water within the purified water reservoir builds sufficiently upon refilling thereof with purified water to offset said combined effects of the feed water pressure and reject water pressure to move said valve member back toward the closed position.

2. The system of claim 1 further including spring means for urging said valve member toward said open position.

3. A reverse osmosis water supply system, comprising:

an inlet conduit for supplying a source of feed water under pressure;

a reverse osmosis unit coupled to said inlet conduit and separating the feed water into purified water and reject water;

control valve means having movable valve member means for controlling feed water flow through said inlet conduit to said reverse osmosis unit, said control valve including a valve body having a feed water inlet coupled to said inlet conduit and a feed water outlet coupled to said reverse osmosis unit, and a valve seat between said feed water inlet and outlet, said valve member means being movable said valve seat to permit feed water flow between said feed water inlet and outlet, and a closed position seated upon and closing said valve seat to prevent feed water flow between said feed water inlet and outlet; said moveable valve member means comprising a single valve member including a first piston portion for opening and closing said valve seat, and a second piston portion subjected to said reject and purified water pressures;

a reservoir container having a purified water reservoir and a reject water reservoir separated by a movable barrier;

means for coupling purified water from said reverse osmosis unit to said purified water reservoir to fill said purified water reservoir;

means for coupling reject water from said reverse osmosis unit to said reject water reservoir;

said movable barrier displacing to expand the volume of said purified water reservoir while reducing the volume of said reject water reservoir, and vice versa, and said container including means for halting displacement of said movable barrier when said purified water reservoir reaches a full condition;

a dispensing valve including a valve actuator movable between open and closed positions;

means for coupling said purified water reservoir to said dispensing valve for dispensing of the purified wter when said actuator is in the open position;

means for subjecting said valve member means to the pressure of the purified water within said purified water reservoir to urge said valve member means toward said closed position;

means for subjecting said valve member means to the pressure of reject water within said reject water reservoir to urge said valve member means toward said open position; and means for supplementing the pressure of reject water acting against said valve member means to urge said valve member means toward said open position;

whereby said valve member means is displaced to the open position by the combined effects of the pressure of reject water and said supplementing means when said actuator is moved to the open position and to maintain said valve member in the open position upon initial movement of said actuator to the closed position until movement of said movable barrier is halted upon said purified water reservoir reaching a full condition and the pressure of said purified water thereupon increasing within the purified water reservoir sufficiently to offset said combined effects and move said valve member means back toward the closed position.

4. The system of claim 3 wherein said supplementing means comprises a spring acting against said movable valve member means.

5. The system of claim 4 wherein said valve member means is oriented for movement toward said open position in response to the pressure of the feed water at the feed water inlet of said valve body.

6. The system of claim 3 wherein said valve member means is oriented for movement toward said open position in response to the pressure of the feed water at the feed water inlet of said valve body.

* * * * *